United States Patent [19]

Stickler et al.

[11] Patent Number: 4,746,425
[45] Date of Patent: May 24, 1988

[54] COOLING SYSTEM FOR ELECTROMAGNETIC WATER TREATING DEVICE

[75] Inventors: Ray E. Stickler, 9909 W. Hawthorne Rd., Mequon, Wis. 53092; William J. Ganley, Mequon; Samuel L. Foster, Eagle, both of Wis.

[73] Assignee: Ray E. Stickler, Milwaukee, Wis.

[21] Appl. No.: 900,750

[22] Filed: Aug. 27, 1986

[51] Int. Cl.$^4$ ............................................. C02F 1/48
[52] U.S. Cl. .................................. 210/175; 210/222; 210/695; 335/300; 336/59; 336/61
[58] Field of Search .................... 336/59, 60, 61; 335/216, 300; 210/175, 184, 186, 222, 223, 695; 209/223.1, 232; 55/100

[56] References Cited

U.S. PATENT DOCUMENTS

| | | | |
|---|---|---|---|
| 438,579 | 10/1890 | Faunce et al. | 210/222 X |
| 1,385,624 | 7/1921 | Kent | 336/61 |
| 1,474,597 | 11/1923 | Kent | 336/61 |
| 1,623,345 | 4/1927 | Hopkins | 336/61 |
| 1,882,201 | 10/1932 | Taetz | 336/61 |
| 1,949,660 | 3/1934 | Roberts | 210/223 X |
| 2,596,743 | 5/1952 | Vermeiren | 210/222 |
| 2,652,925 | 9/1953 | Vermeiren | 210/222 |
| 3,179,908 | 4/1965 | Peabody | 336/61 |
| 3,428,928 | 2/1969 | Maines | 336/61 |
| 3,869,686 | 3/1975 | Benz | 335/216 |
| 4,009,459 | 2/1977 | Benson et al. | 335/300 |
| 4,151,090 | 4/1979 | Brigante | 210/222 |
| 4,288,323 | 9/1981 | Brigante | 210/222 |
| 4,407,719 | 10/1983 | Van Gorp | 210/695 |
| 4,427,544 | 1/1984 | Roch | 210/222 |
| 4,460,464 | 7/1984 | Donath | 210/1223 |
| 4,496,923 | 1/1985 | Lenzing | 336/59 |
| 4,659,479 | 4/1987 | Stickler et al. | 210/222 |

Primary Examiner—Richard V. Fisher
Assistant Examiner—W. Gary Jones
Attorney, Agent, or Firm—Fred Wiviott

[57] ABSTRACT

A device for treating aqueous solutions with magnetic lines of force includes a pipe through which the solution passes. An electromagnetic coil surrounds the pipe and a core consisting of endwise connected alternating short sections of magnetic and non-magnetic material is disposed coaxially with and spaced from the pipe. Located between the pipe and the core is a helical baffle. A housing is spaced from and surrounds the coil. Air circulation vents are located at the upper and lower ends of the housing. Annular cooling fins extend outwardly through the coil with their outer peripheries terminating in the gap between the coil and the housing. A plurality of apertures are formed in the exposed outer portions of each cooling fin with the apertures of one fin being staggered relative to the apertures of the adjacent fins.

16 Claims, 1 Drawing Sheet

COOLING SYSTEM FOR ELECTROMAGNETIC WATER TREATING DEVICE

BACKGROUND OF THE INVENTION

This invention relates to electromagnetic water treating devices, and more particularly to cooling systems for such devices.

Magnetic water treating devices are well known in the prior art. Most such devices pass the fluid to be treated through a magnetic field which may be provided by electromagnetic coils or permanent magnetics. Such prior art electromagnetic treaters are shown, for example, in U.S. Pat. Nos. 438,579; 1,949,660; 2,596,743; 2,652,929; 2,939,830; 4,151,090; 4,226,720; 4,288,323; 4,299,701; 4,347,133; 4,407,719; 4,427,544; and co-pending application Ser. No. 683,723, filed Dec. 19, 1984, and British Patent Nos. 625,732 and 675,369. Because the coils of these electromagnetic water treating devices are employed in and around feed water piping for apertures such as boilers, such coils tend to be located in confined spaces. As a result, coil overheating is a problem in at least some of these devices, depending, of course, upon the magnitude of the energizing currents and the heat losses generated.

SUMMARY OF THE INVENTION

It is an object of the invention to provide a new and improved fluid treating device.

A further object of the invention is to provide a magnetic water treating device which prevents the formation of scale in aqueous solutions.

Another object of the invention is to provide an electromagnetic water treating device having a new and improved cooling system.

Yet another object of the invention is to provide an electromagnetic water treating device which is not subject to overheating.

These and other objects and advantages of the invention will become more apparent from the detailed description thereof taken with the accompanying drawings.

In general terms the invention comprises a device for treating an aqueous solution with magnetic lines of force and including a pipe through which the solution passes, an electromagnetic coil surrounding the pipe, core means disposed within the pipe and spaced therefrom, a housing surrounding the coil means and spaced therefrom, and a plurality of cooling fins extending in spaced apart relation through the coil and outwardly past the surface thereof and into the gap between the coil and the housing.

DETAILED DESCRIPTION OF THE PREFERRED EMBODIMENT

Figure 1:
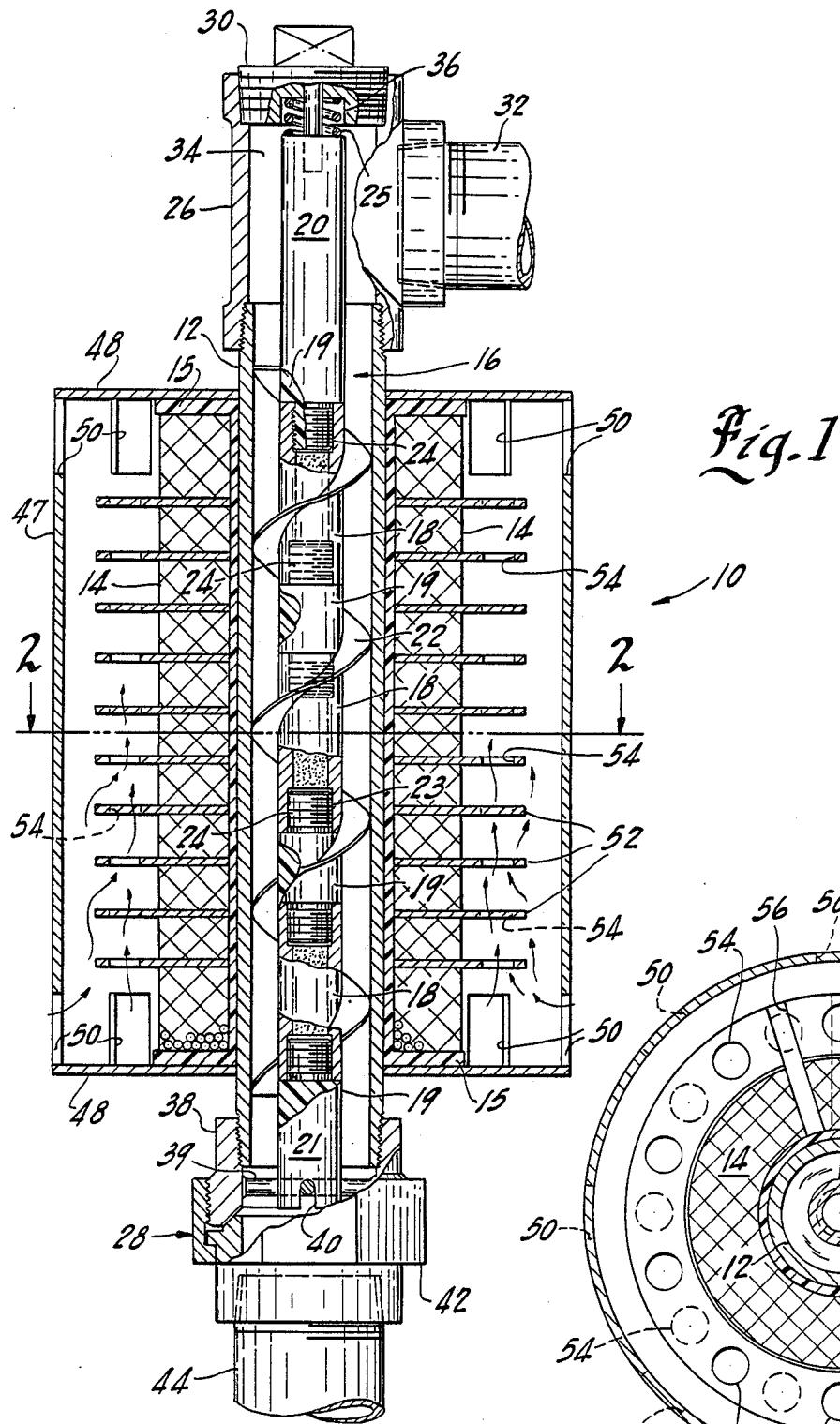
FIG. 1 is a side elevational view with parts broken away of the water treating device in accordance with the preferred embodiment of the invention.

The water purifying device in accordance with the preferred embodiment of the invention is shown in FIG. 1 to include a pipe 12 through which the solution being treated flows. An electromagnetic coil 14 is shown in concentric surrounding relation to pipe 12 and is insulated therefrom in any suitable manner, such as by an electrically insulting spool 15. Extending along the axis of the pipe 12 is a core 16 which in the preferred embodiment is formed of endwise connected, alternating short cylindrical sections 18 and 19, respectively. The sections 18 are formed of a ferrous material having high magnetic permeability, such as tubular steel sections filled with an iron powder, and the sections 19 are formed by a non-metallic material having low magnetic permeability, such as nylon. There are also non-magnetic sections 20 and 21 at each end of the core 16. Disposed between the core 16 and the pipe 12 is a helical baffle 21 which defines a helical flow path between the opposite ends of pipe 12. Both the pipe 12 and the baffle 21 are preferably of stainless steel and the baffle 21 is fixed in position in any suitable manner such as by tack welding at its opposite ends to the inner surface of the pipe 12. The inner edge of the baffle 21 is spaced from the core 16 so that the latter may be removed and replaced.

The magnetic core members 18 preferably comprise short tubular steel members which have internal threads 23 formed at each of its opposite ends. The nylon sections 19 are also generally cylindrical members which have external threads 24 at each of their opposite ends for engaging the internal threads at the ends of the metallic members 18. The end members 20 and 21 are of an equal length and each has external threads 24 for being attached to the endmost ones of the members 18.

The opposite ends of the pipe 12 are threaded for receiving internally threaded coupling members 26 and 28. The coupling 26 is a T-joint having a tapered, threaded plug 20 at one end. Extending radially from the mid-section of coupling 26 is a water exit pipe 32. A compression spring 34 engages the end section 24 of core 16 and is received within a recess 26 formed in the plug 30 for urging the core 16 downwardly as viewed in FIG. 1.

The coupling 28 includes a first coupling member 38 which is threadably received on pipe 12 and has an X-shaped anchoring member 29 extending from one side to the other and positioned to be engaged by a complementary groove 40 formed in the end portion 21 of core 16. A second coupling member 42 secures one end of the water inlet pipe 44 to coupling 38. It will be appreciated that the spring 34 retains the rod 16 in position against the member 39. Removal of the plug 30 will permit the core to be withdrawn and replaced.

A hollow cylindrical housing 46 is spaced from and secured in concentric surrounding relation to the pipe 12 and the coil 14. The housing 46 includes a tubular portion 47 concentric with and spaced from the coil 14 and a pair of end plates extending radially from the pipe 12 and suitably fixed thereto. The housing portions are preferably formed of a high magnetically permeable material such as steel. Accordingly, the housing 46 provides a path for the electromagnetic field generated when the coil 14 is energized and prevents a stray magnetic field outside of the device. A plurality of slots 50 are formed in each end of the cylindrical housing portion 47 to permit air flow therebetween and upwardly through the housing 46.

Figure 2:
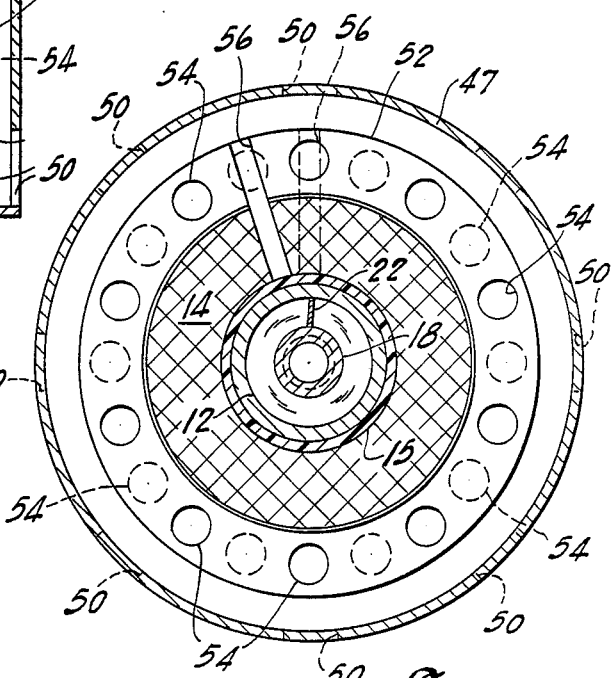
FIG. 2 is a view taken along lines 2—2 of FIG. 1.

A plurality of annular cooling fins 52 are fixed to the inner surface of the coil spool 15 and extend radially outwardly therefrom in parallelism with each other and past the surface of the coil 14. The cooling fins 52 are equi-spaced along the axis of coil 14 and have circular outer peripheries which are spaced from the inner surface of the housing 46. A plurality of equi-spaced holes 54 are formed in each of the cooling fins 52 and preferably at the mid-point between the outer surface of coil 14 and their outer peripheries. According to the illustrated embodiment of the invention, the diameter of the holes are equal to about one-half of this distance. The holes 54 in each of the cooling fins 52 as shown by full lines in FIG. 2 are staggered relative to the holes 54 in the next adjacent fin as shown by broken lines. Also, slots 56 may be formed in each cooling fin 52 to permit the coil 14 to be continuously wound.

While the cooling fins 52 may be formed of any suitable material, in the preferred embodiment, each is formed of a material such as aluminum having a high coefficient of thermal conductivity and low relative magnetic permeability.

In operation, coil 14 may be energized by alternating or direct current although in the preferred embodiment, direct current is employed. This magnetizes each of the metallic tubular sections 18 to oppositely polarize the ends of each section. Depending upon the direction of current flow, the opposed ends of adjacent magnetic sections 18 will have a north-south relation so that magnetic lines of force will pass therebetween. In addition, a magnetic shunt path will be provided between the ends of the coil and through the housing 46.

Along with the energization of coil 14, the liquid being treated will be delivered to the inlet pipe 44 and withdrawn through the exit pipe 32. The liquid flowing through the pipe 12 will follow a helical path defined by the baffle 22. As the water moves along this helical path, it will cross the magnetic lines of force emanating from each of the magnetic members 18 and at a relatively large arcuate angle. In addition, because the helical path defined by baffle 22 increases the distance traveled by the liquid as it passes through the pipe 12, end-to-end flow velocity within the pipe will be increased.

The heat generated by coil 14 is tranferred by the cooling fins 52 from the interior portions of the coil to the gap between the coil and the housing 46. In addition, a cooling air flow path is provided between the slots 50 at the opposite ends of the housing 46 with relatively cooler air entering the slots 50 at the lower end of the housing and heated air exiting those at the upper end as a result of a chimney defect. A portion of this cooling air will flow through the holes 54 in the fins 52, and a second portion will flow between the housing 46 and the outer peripheries of the fins. As the cooling air passing through the holes 54, it will be forced to traverse a torturous path as it passes from hole to hole in adjacent plates as a result of the staggered relationship of the holes. As a result, the air will move in a direction parallel to the plates as it moves from hole to hole and upwardly through the housing to enhance the cooling effect.

While only a single embodiment of the invention has been illustrated and described, it is not intended to be limited thereby but only by the scope of the appended claims.

We claim:

1. A device for treating an aqueous solution with magnetic lines of force, said device including:
   conduit means through which the solution passes,
   an electromagnetic coil surrounding said conduit means,
   a housing surrounding said coil and spaced therefrom defining a gap,
   and a plurality of spaced apart cooling fins extending through said coil and outwardly past the surface thereof and into the gap between said coil means and said housing,
   each of said cooling fins having a plurality of spaced apart holes formed therein and in the portion thereof between the surface of said coil and the outer periphery of said cooling fins,
   the holes in adjacent cooling fins being staggered relative to those in each adjacent cooling fin so that cooling air passing through said openings is forced to flow in a tortuous flow path between said fins and in a circumferential direction along the surface of said coil.

2. The device set forth in claim 1 wherein the said coil and housing are oriented vertically, said cooling fins being spaced apart vertically along said coil, and vent means formed in the upper and lower ends of said housing to provide a passage for cooling air upwardly through said housing and past said cooling fins.

3. The device set forth in claim 2 wherein said cooling fins each comprise a generally annular plate, said plates being disposed in an equi-spaced parallel relation along said coil.

4. The device set forth in claim 3 wherein the diameters of said cooling fins are generally equal and each comprises a metallic material having a high coefficient of thermal conductivity and low magentic permeability.

5. The device set forth in claim 1 wherein said cooling fins each comprise a generally circular plate, said plates being disposed in an equi-spaced parallel relation along said coil.

6. The device set forth in claim 5 wherein the diameters of said cooling fins are generally equal and each comprises a metallic material having a high coefficient of thermal conductivity and low magnetic permeability.

7. The device set forth in claim 5 wherein said circular plates have generally uniform diameters and the outer peripheries of said plates are spaced from said housing.

8. The device set forth in claim 7 wherein the holes formed in said plates have a diameter equal to about one-half the distance between the outer surface of said coil and the outer peripheries of said plates.

9. A device for treating an aqueous solution with magnetic lines of force, said device including: conduit means through which the solution passes, an electromagnetic coil surrounding said conduit means, core means disposed within said conduit and spaced therefrom, a housing surrounding said coil and spaced therefrom defining a gap, a plurality of cooling fin means extending in spaced apart relation through said coil and outwardly past the surface thereof and into the gap between said coil and said housing, said coil and housing being oriented vertically, said cooling fin means being spaced apart vertically along said coil, and vent means formed in the upper and lower ends of said housing to provide a passage for cooling air upwardly through said housing and past said cooling fin means, each of said cooling fin means having a plurality of spaced apart holes formed therein and in the portion thereof between the surface of said coil and the outer periphery of said cooling fin means, the holes in adjacent cooling fin means being staggered relative to each other so that cooling air passing through said holes is forced to flow in a tortuous flow path, said core means including alternating sections of a ferrous magnetic material and a nonferrous nonmagnetic material.

10. The device set forth in claim 9 and including baffle means disposed between said conduit means and said core means for defining a convoluted flow path for the solution as it flows between the opposite ends of said conduit means.

11. The device set forth in claim 10 wherein the surface of the ferrous magnetic sections is exposed to the aqueous solution being treated.

12. An electrical device including:
    an electromagnetic coil,
    a housing surrounding said coil and spaced therefrom defining a gap;
    and a plurality of cooling fins extending in a spaced apart relation through said coil and outwardly past the surface thereof and into the gap between said coil and said housing,
    the outer peripheries of said cooling fins being spaced from said housing,
    each of said cooling fins having a plurality of spaced apart holes formed therein and in the portion thereof between their outer peripheries and the surface of said coil, the holes in adjacent cooling fins being staggered relative to each other so that cooling air passing through said openings is forced to flow in a tortuous flow path along the surfaces of said fins and in the circumferential direction along the surface of said coil between said cooling fins.

13. The device set forth in claim 12 wherein said coil and housing are oriented vertically, said cooling fins being spaced apart vertically along said coil, and vent means formed in the upper and lower ends of said housing to provide a passage for cooling air upwardly through said housing and past said cooling fins.

14. The device set forth in claim 12 wherein said cooling fins each comprise a generally annular plate, said plates being disposed in an equi-spaced parallel relation along said coil.

15. The device set forth in claim 14 wherein said cooling fins comprise a metallic material having a high coeffect of thermal conductivity and low magnetic permeability.

16. The device set forth in claim 15 wherein said fins have generally uniform diameters and the holes formed in said fins have a diameter equal to about one-half the distance between the outer peripheries of said fins and the surface of said coil.

* * * * *